(12) United States Patent
Bass et al.

(10) Patent No.: US 7,672,346 B1
(45) Date of Patent: Mar. 2, 2010

(54) NARROW SPECTRAL WIDTH LASERS OPTIMIZED AND TEMPERATURE STABILIZED WITH VOLUME BRAGG GRATING MIRRORS

(75) Inventors: Michael Bass, Indian River Shores, FL (US); Te-Yuan Chung, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 41 days.

(21) Appl. No.: 11/583,479

(22) Filed: Oct. 19, 2006

Related U.S. Application Data

(60) Provisional application No. 60/730,528, filed on Oct. 26, 2005.

(51) Int. Cl.
*H01S 3/04* (2006.01)
*H01S 3/13* (2006.01)
(52) U.S. Cl. .................................. 372/34; 372/29.01
(58) Field of Classification Search ................. 372/102, 372/34, 29.01
See application file for complete search history.

(56) References Cited

U.S. PATENT DOCUMENTS

| | | | |
|---|---|---|---|
| 6,586,141 B1 | 7/2003 | Efimov et al. | 430/1 |
| 6,673,497 B2 | 1/2004 | Efimov et al. | 430/1 |
| 6,897,999 B1 | 5/2005 | Bass et al. | 359/326 |
| 6,992,825 B2 * | 1/2006 | Okuta | 359/569 |
| 7,095,772 B1 | 8/2006 | Delfyett et al. | 372/50.22 |
| 7,218,655 B2 * | 5/2007 | Wang et al. | 372/29.01 |
| 2003/0219205 A1 * | 11/2003 | Volodin et al. | 385/37 |
| 2006/0114961 A1 * | 6/2006 | Manni | 372/70 |

OTHER PUBLICATIONS

Te-yuan Chung, V. Smirnov, M. Hemmer, L.B. Glebov, M.C. Richardson, and M. Bass, "Unexpected properties of a laser resonator with volumetric Bragg grating end mirrors," paper CFB5, CLEO/WELS, Long Beach, CA, (2006) 4 pgs.

T. Chung, A. Rapaport, Y.Chen, V. Smirnov, M. Hemmer, L.B. Glebov, M.C. Richardson and M. Bass, "Spectral narrowing of solid state lasers by narrow-band PTR Bragg mirrors," paper CREOL, College of Optics and Photonics, Uni, Central Florida, 10 pgs., (2006).

T. Chung, A. Rapaport, Y. Chen, V. Smirnov, L.B. Glebov, M.C. Richardson, M. Bass, "Stabilization, spectral narrowing and optimization of solid state lasers using volumetric PTR Bragg grating cavity mirrors." Paper, CREOL, College of Optics and Photonics, Uni, Central Florida, SSDLTR (2006) 5 pgs.

(Continued)

*Primary Examiner*—Minsun Harvey
*Assistant Examiner*—Patrick Stafford
(74) *Attorney, Agent, or Firm*—Brian S. Steinberger; Phyllis K. Wood; Law Offices of Brian S. Steinberger, P.A.

(57) ABSTRACT

Apparatus, methods, systems and devices for temperature independent or minimally temperature dependent narrow spectrum laser having an optimized output. The resonator includes at least one volume Bragg grating mirror that changes reflectance with temperature. The volume Bragg grating mirror in combination with a narrow spectrum laser optimizes the laser performance by being temperature tuned to the optimum reflectance. In an embodiment, the volume Bragg grating mirror has a temperature dependent reflectance that compensates for changes in the stimulated emission cross section of the gain medium and leads to a laser with output energy that is independent of temperature.

15 Claims, 5 Drawing Sheets

OTHER PUBLICATIONS

Igor V. Ciapurin, L.B. Glebov, Vadim I. Smirnov, "Modeling of phase volume diffractive gratings, part 1: transmitting sinusoidal uniform gratings," Optical Engineering, vol. 45 (1), 015802, Jan. 2006, 9 pages.

P.F. McManamon, E.A. Watson, "Nonmechanical Beam Steering for Passive Sensors," Proceeding of SPIE, vol. 4369, 2001, pp. 140-148.

P.F. McManamon, Jianru Shi, P.J. Bos, "Broadband optical phased-array beam steering," Optical Engineering, vol. 44 (12), Dec. 2005, 5 pages.

L.B. Glebov, V.I. Smirnov, C.M. Stickley, I.V. Ciapurin, "New approach to robust optics for HEL systems," Proceedings of SPIE, vol. 4724, 2002, pp. 101-109.

* cited by examiner

US 7,672,346 B1

NARROW SPECTRAL WIDTH LASERS OPTIMIZED AND TEMPERATURE STABILIZED WITH VOLUME BRAGG GRATING MIRRORS

This application claims the benefit of priority to U.S. Provisional Patent Application No. 60/730,528 filed on Oct. 26, 2005 and was supported by DARPA Contract Nos. HR00110410002 and HR00110410004 and Sandia National Laboratories Agency No. AT2115.

FIELD OF THE INVENTION

This invention relates to lasers and, in particular, to methods, systems, apparatus and devices for narrow spectral width lasers that employ narrow emission spectrum gain media and that operate over a wide range of temperature with minimum variation in performance.

BACKGROUND AND PRIOR ART

Solid state lasers are commonly used in field applications where the operating temperature may vary from minus 50° C. to plus 50° C. However, the stimulated emission cross section of the laser material depends on the temperature as described in M. Bass, L. Weichman, S. Vigil, and B. Brickeen, "The temperature dependence of $Nd^{3+}$ doped solid-state lasers," IEEE Journal of Quantum Electronics, vol. 39, pp. 741-748, (2003). Therefore, long pulse and active/passive Q-switched solid state lasers are temperature dependent. It has been assumed that the reflectivity of the mirrors in the laser resonators were independent of temperature since the laser mirrors are typically dielectric coatings and do not show a change in reflectivity with temperature in the range of approximately minus 50° C. and approximately plus 50° C. The only temperature dependent quantity in the output energy of the laser was considered to be the stimulated emission cross section. This quantity in such lasers as Nd:YAG and Nd:GSGG lasers decreases with increasing temperature.

An actively Q-switched laser's output energy decreased when the input energy remained constant or increased if the Q-switched laser was pumped to the amplified spontaneous emission limit at different temperatures. In Bass et al., the temperature dependence was analyzed and demonstrated for lasers with mirrors having reflectivities that were independent of temperature. Dielectric coated laser mirror reflectance does not generally vary with temperature. On the other hand, the reflectivity of a VBG will depend on temperature since thermal expansion changes the spacing of the grating planes. The present invention involves the effect of the temperature dependence of the reflectivity of volume Bragg grating (VBG) mirrors on laser performance and using the temperature dependence of mirror reflectivity to produce lasers, such as Nd:YAG lasers, that operate in the field without temperature dependence.

SUMMARY OF THE INVENTION

A primary objective of the invention is to provide new methods, systems, apparatus and devices for lasers that are temperature independent for use in a wide range of climatic conditions A secondary objective of the invention is to provide new methods, systems, apparatus and devices for lasers that are optimized and temperature stabilized for use in a wide range of climatic conditions.

A third objective of the invention is to provide new methods, systems, apparatus and devices for lasers that are minimally temperature dependent for use in a wide range of climatic condition.

A fourth objective of the invention is to provide new methods, systems, apparatus and devices for lasers using mirrors with reflectivities that vary with temperature for temperature independent operation of the lasers.

A fifth objective of the invention is to provide new methods, systems, apparatus and devices for using the temperature dependence of the reflectivity of volume Bragg grating mirrors for temperature independent operation of lasers.

A sixth objective of the invention is to provide new methods, systems, apparatus and devices for temperature independent lasers for commercial and military use.

A first preferred embodiment of the invention provides a laser device having temperature independent performance. The lasing device includes a laser using a narrow gain spectrum media and a resonator coupled with the laser, the resonator having at least one volume Bragg grating mirror with a temperature dependent reflectance in a region where stimulated emission occurs, wherein a change in reflectivity of the volume Bragg grating mirror with temperature compensates for a change in stimulated emission cross section with temperature. In an embodiment, the at least one volume Bragg grating mirror includes a first and a second volume Bragg grating mirror having a first and a second reflectance, wherein the temperature difference between the first and second volume Bragg grating mirrors is selected so that the reflectance spectrum of one volume Bragg grating mirror is shifted with respect to the other to alter the effective reflectance in the resonator. The laser further includes a temperature controlled chamber for housing the at least one volume Bragg grating mirror to maintain optimum output coupling at approximately all environmental temperatures. The laser may be a long pulse solid state laser, wherein the reflectively of the volume Bragg grating mirror increases with temperature to maintain constant output energy or a short pulse solid state laser, wherein the reflectively of the volume Bragg grating mirror decreases with temperature to maintain constant output energy.

A second embodiment provides a method for optimizing a laser output energy by providing a laser, selecting at least one volume Bragg grating mirror prepared in photo-thermal refractive glass that is temperature dependent to compensate for a change in the stimulated emission cross section with operational temperatures, and coupling a resonator incorporating the least one volume Bragg grating mirror with the laser to optimize the output of the laser, wherein the laser operates over a wide range of temperatures with minimal variation in performance. In an embodiment, selecting at least one volume Bragg grating mirror includes selecting a first and a second volume Bragg grating mirror so that the temperature difference $\Delta T$ between the them shifts the reflectance spectrum of one mirror with respect to the other to alter the effective reflectance in the resonator. The temperature difference $\Delta T$ is selected to optimize the output of the laser, and a change in reflectivity with temperature is selected to maintain the optimized output over a wide range of operational temperatures.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The methods, systems, apparatus and devices of the present invention provide lasers that employ narrow emission spectrum gain media and that operate over a wide range of temperatures with minimum or no variation in their performance. It has been found that certain resonator mirrors are temperature dependent. Therefore, a mirror can be selected to compensate for the change in the stimulated emission cross section to hold the output energy constant with operational temperature variations.

In an embodiment, the reflectively of the output coupling mirror was selected to increase with temperature to maintain constant output energy of a long pulse Nd:YAG laser. Conversely, if the laser were actively Q-switched and always pumped with the same input energy, then the output coupling mirror reflectively would have to decrease with temperature to maintain constant output energy.

The present invention uses the temperature dependence of the reflective properties of the volume Bragg gratings such as those made in photo-thermal-refractive (PTR) glass as described in U.S. Pat. No. 6,586,141 issued on Jul. 1, 2003 to Efimov et al. A volume Bragg grating mirror is only one type of mirror that might be used according to the present invention. For example, a thin film dielectric mirror having the required temperature dependence could also be used, if available.

Figure 1:
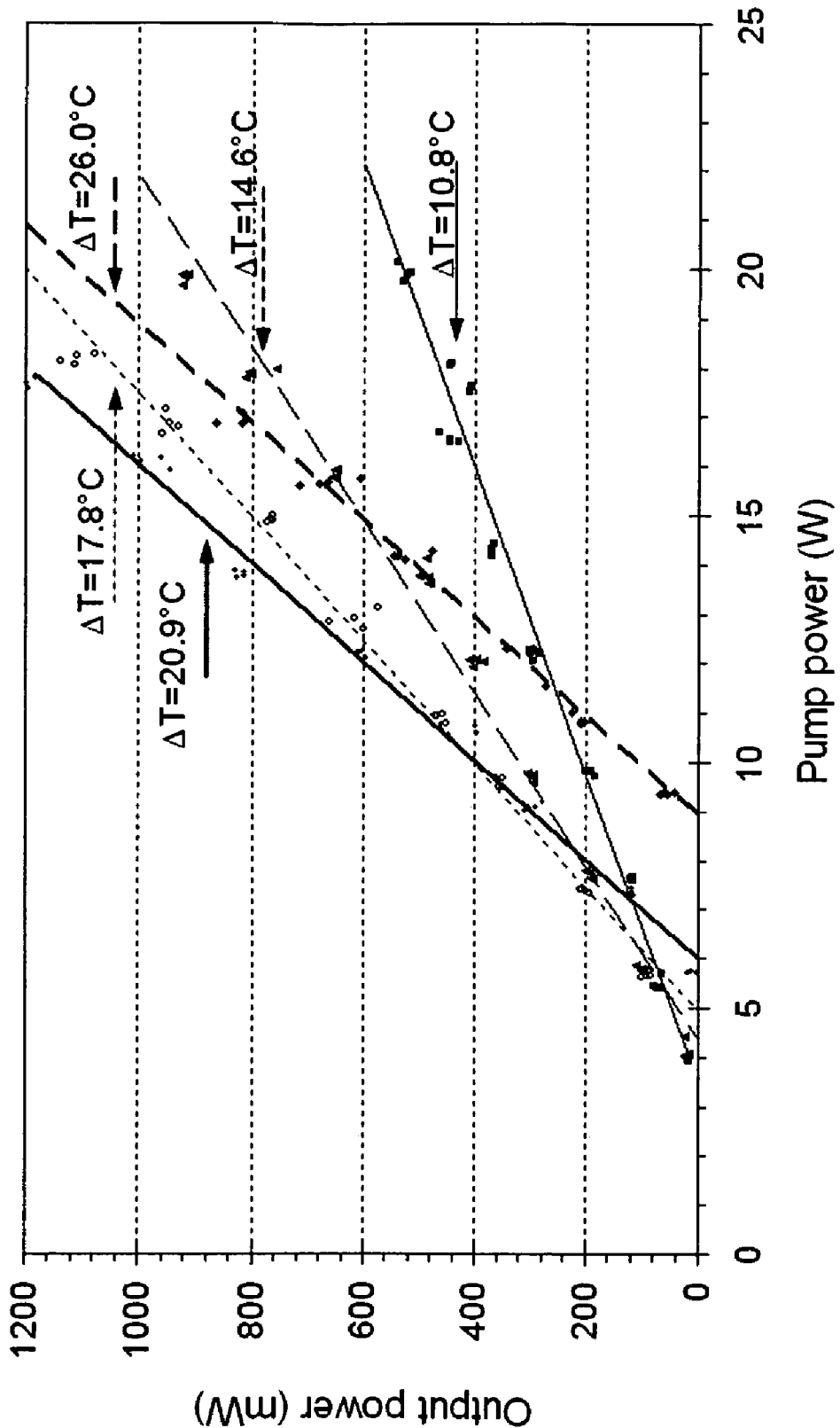
FIG. 1 is a graph showing the output power $P_{out}$ versus input power $P_{in}$ of the "X" cavity Ti:Sapphire laser with volume Bragg grating end mirrors for five volume Bragg grating temperature differences.

Reflectance of a dielectric coated laser mirror does not generally vary with temperature. However, the reflectivity of a VBG does depend on temperature because thermal expansion changes the spacing of the grating planes. The present invention takes advantage of the fact that the temperature dependence of a VBG mirror could be used to control the performance of a laser. A pair of almost identical VBG mirrors prepared in photo thermal refractive (PTR) glass replaced the dielectric mirrors in a standard X cavity CW Ti:Sapphire laser as described in T-y. Chung, V. Smirnov, M. Hemmer, L. B. Glebov, M. C. Richardson, and M. Bass, "Unexpected properties of a laser resonator with volumetric Bragg grating end mirrors," paper CFB5, CLEO/QELS, Long Beach, Calif., (2006). By properly selecting a temperature difference between these two mirrors, the reflectance spectrum of one VBG is shifted with respect to the other and hence alters the effective reflectance in the resonator. FIG. 1 is a graph showing the output power $P_{out}$ versus input power $P_{in}$ of the "X" cavity Ti:Sapphire laser with volume Bragg grating end mirrors. In FIG. 1, the total output power, $P_{out}$, as a function of input power, $P_{in}$ is shown for several temperature differences, $\Delta T$, between the two VBG mirrors. The solid lines are the linear fits of the data and show that the output of the laser at with a low temperature difference has a low threshold and low slope efficiency.

When the temperature difference $\Delta T$ was increased the threshold and the slope efficiency increased. When the temperature difference $\Delta T$ exceeded 21° C. the slope efficiency did not change noticeably but the threshold continued to increase as shown by the solid line representing $\Delta T=20.9°$ C. and the dashed line representing $\Delta T=26.0°$ C. The observed behavior shows that the resonator output coupling increased (the effective reflectance decreased) as the temperature difference $\Delta T$ increased. As the increase in slope efficiency with temperature difference shows, the output could be optimized by selecting a desired temperature difference $\Delta T$. This makes possible a laser system with total control of output coupling. That is, by choosing the temperature difference $\Delta T$, the output can be optimized, and then by selecting the change in reflectivity with temperature, that condition can be maintained over a wide range of temperature. This demonstrated temperature dependence of the effective reflectivity of a laser resonator containing a VBG mirror is used to design lasers such as Nd:YAG and, similarly, other lasers that operate independently of temperature.

Figure 2A:
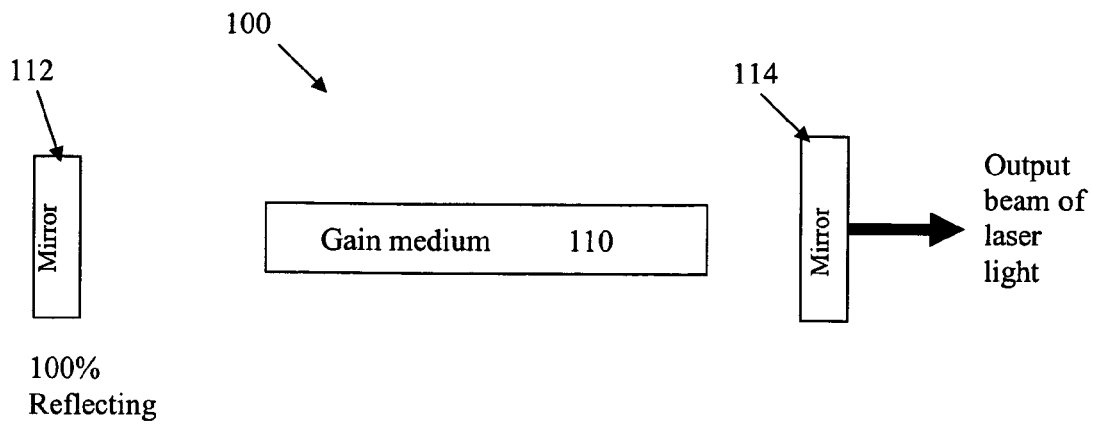
FIG. 2a is a block diagram of a common long pulse laser showing the gain medium and resonator mirrors.
Figure 2B:
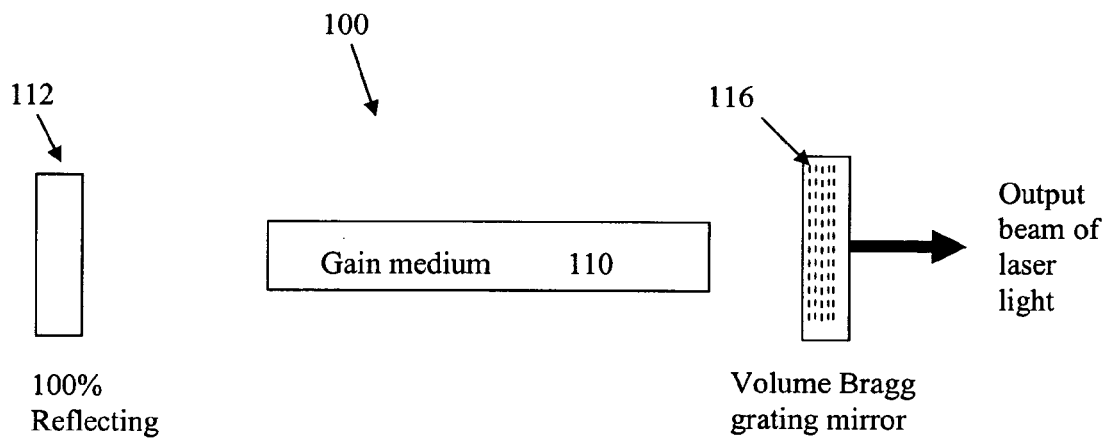
FIG. 2b is a block diagram of a long pulse laser showing the gain medium, the resonator with a reflecting mirror and a volume Bragg grating mirror.
Figure 2C:
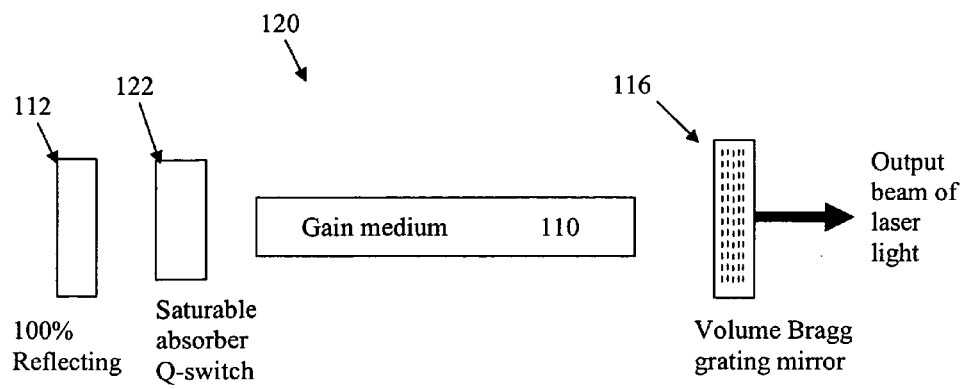
FIG. 2c shows an example of a passively Q-switched laser according to the present invention.
Figure 2D:
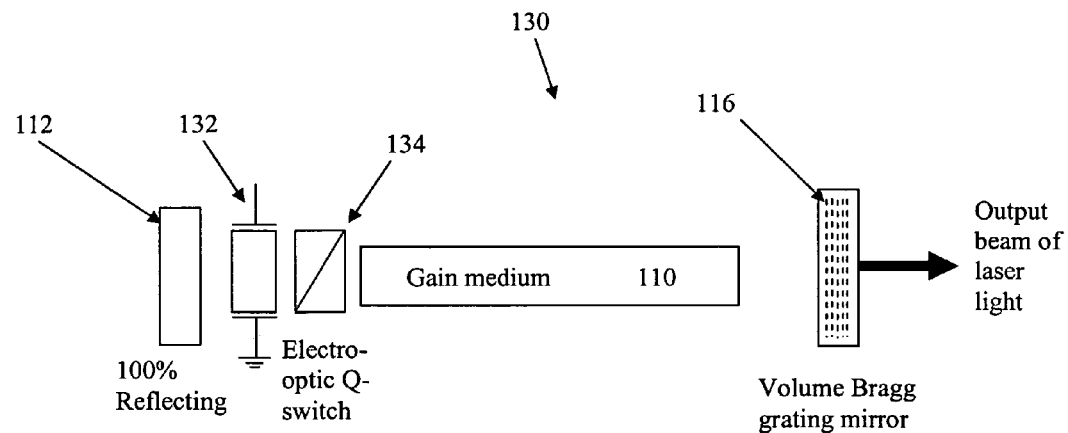
FIG. 2d shows an example of an actively Q-switched laser according to the present invention.

FIG. 2a is a block diagram of a common long pulse laser 100 showing the gain medium 110 and resonator mirrors 112 and 114. The first resonator mirror 112 is a 100% reflecting mirror and the second resonator mirror is a partially reflecting mirror 114. FIG. 2b is a block diagram of a long pulse laser 100 according to the present invention showing the gain medium 110, the resonator with a reflecting mirror 112 and a volume Bragg grating mirror 116 serving as a partly reflecting mirror. The volume Bragg grating mirror 116 has a reflectivity that is dependent on temperature. The dashed lines shown on the partly reflecting volume Bragg grating mirror 116 represent the planes of the gratings. FIG. 2c is a another block diagram of a passively Q-switched laser 120 showing the gain medium 110, the resonator 100% reflecting mirror 112, and a volume Bragg grating mirror 116 serving as the partly reflecting mirror and which has a reflectivity that is dependent on temperature and an intracavity saturable absorber passive Q-switch 122. Another example is shown in FIG. 2d, which shows an actively Q-switched laser 130 showing the gain medium 110, the resonator 100% reflecting mirror 112 and a volume Bragg grating mirror 116 serving as the partly reflecting mirror, and which has a reflectivity that is dependent on temperature, and an intracavity active Q-switch composed of a polarizing prism 134 and an electro-optic polarization rotator 132.

A laser with temperature independent performance is one for which the derivative of the laser output energy with respect to temperature, $dE_{out}(T)/dT$, is 0. This is called the temperature independence condition. As described in Bass et al., "The temperature dependence of Nd$^{3+}$ doped solid-state lasers," IEEE Journal of Quantum Electronics, vol. 39, pp. 741-748, (2003), with only the stimulated emission cross section as a temperature dependent quantity this condition could not be met. However, having demonstrated VBG based resonators with temperature dependent reflectivity, it is reasonable to examine several types of Nd:YAG laser operation to find the properties that result in temperature independence.

In the following analysis, only the laser mirror reflectivity needed for temperature independent operation is considered. For purpose of discussion, other issues, such as the laser optics being heated by the laser light itself, are not considered although self heating could be a problem in very high power lasers. The common parameters for the Nd:YAG lasers evaluated are listed in Table 1.

TABLE 1

| Gain properties | | Cavity properties | |
| --- | --- | --- | --- |
| Material | Nd:YAG | L | 0.03 |
| $\sigma(T_0)$ (l/m$^2$) | $1.58 \times 10^{-23}$ | $R(T_0)$ | 0.50 |
| $d\sigma(T)/dT$ (l/m$^2$K) | $-3.72 \times 10^{-26}$ | l(m) | 0.10 |
| $\gamma$ | 2 | $T_0$(K) | 293.16 |

For a long pulse laser the output energy is $$E_{out}(T) = \eta_s(T) \cdot [E_{in} - E_{th}(T)] \qquad (1)$$

Where $E_{in}$ is the input or pump energy. $E_{th}(T)$ is the threshold energy given by $$E_{th}(T) = \frac{Ah\nu_p}{\sigma(T)\tau_f \cdot \eta_{pe}} \cdot \{L - \ln[R(T)]\} t_p \qquad (2)$$

$\eta_{pe}$ is the over all pump efficiency, $\tau_f$ is the fluorescence lifetime, $t_p$ is the pump pulse duration and A is the laser area. R(T) is the temperature dependent reflectivity of the resonator output coupler and L is the sum of all the nonproductive intracavity losses. The slope efficiency is $$\eta_s(T) = 2 \cdot \frac{1 - R(T)}{1 + R(T)} \cdot \frac{1}{L - \ln[R(T)]} \qquad (3)$$

Differentiating (1) we find $dE_{out}(T)/dT=0$ when $$\frac{dR(T)}{dT} = \frac{\frac{R(T) \cdot \{L - \ln[R(T)]\}}{\sigma(T)} + 1}{R^2(T) + 2\{L - \ln[R(T)]\} \cdot R(T) - 1} \cdot \frac{1 - R^2(T)}{\frac{E_{in}}{E_{th}(T)} - 1} \cdot \frac{d\sigma(T)}{dT} \qquad (4)$$

Figure 3:
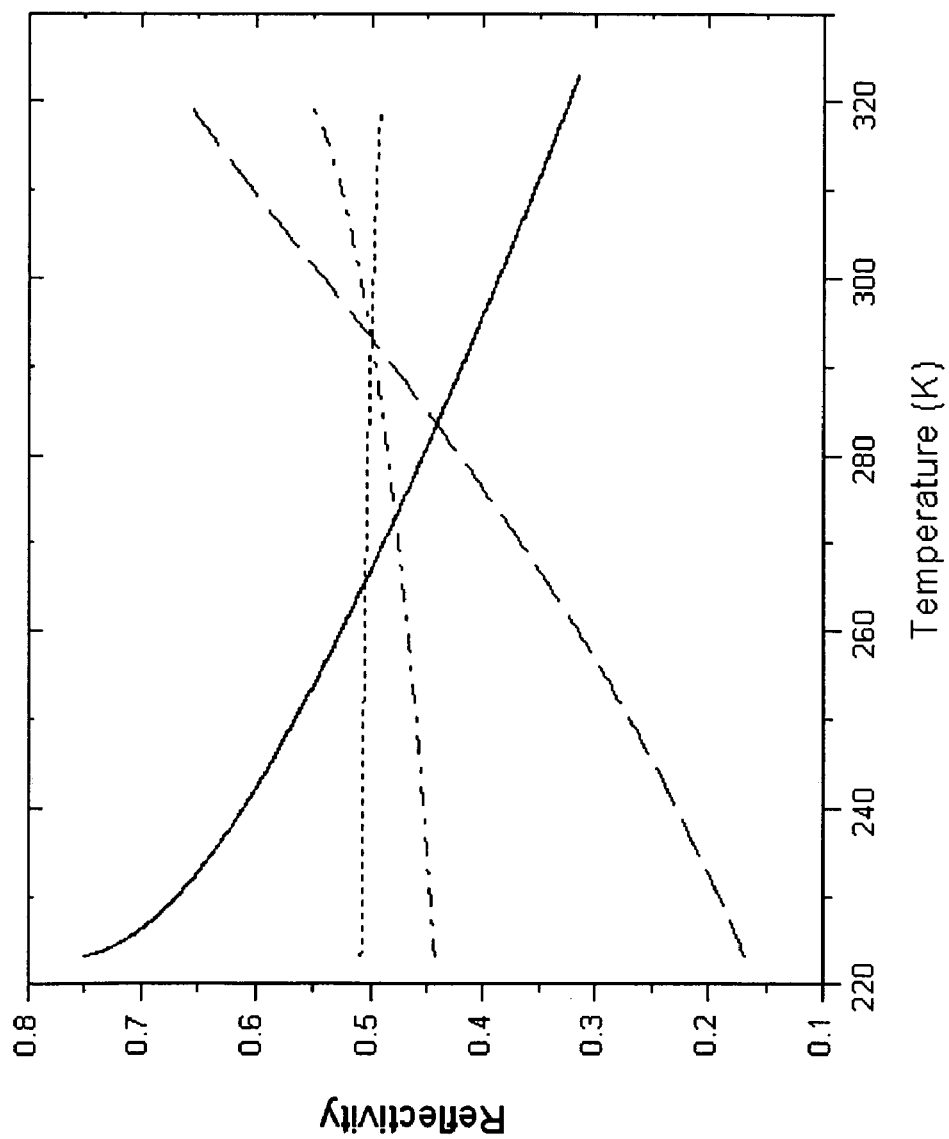
FIG. 3 is a graph showing reflectivity versus Nd:YAG gain medium temperature.

In this example the input pump energy is taken as 20 times the threshold energy at $T_0$ so that there is a realistic output from the laser. Numerical evaluation of equation (4) results in the dash-dot curve shown in FIG. 2 for R(T) that results in a temperature independent long pulse Nd:YAG laser. dR/dT at 293.16 K is $1.24 \times 10^{-3}$. In FIG. 3, the dash-dot line represents long pulse operation, the dotted line represents an actively Q-switched with constant pump energy, the dashed line represents actively Q-switched laser pumped to the ASE limit, and the solid line represents the Cr:YAG passively Q-switched laser.

Analysis of actively Q-switched operation with fixed pump power requires knowledge of the threshold population density, $n_t$, for the laser when the switch is open or $$n_t(T) = \frac{L - \ln[R(T)]}{2l\sigma(T)} \qquad (5)$$

The relation between the initial, $n_i$ and final, $n_f$, population densities is $$n_f(T) - n_i - n_t(T) \cdot \ln\left[\frac{n_f(T)}{n_i(T)}\right] = 0 \qquad (6)$$

Solving equation (6) gives $$n_f(T) = -n_t(T) \cdot W\left[\frac{-n_i}{n_t(T)} \cdot e^{\frac{-n_i}{n_t(T)}}\right] \qquad (7)$$

Where W is the Lambert W-function, also known as the omega function described in R. Corless, G. Gonnet, D. Hare, D. Jeffrey, and D. Knuth, "On the Lambert W function," Advances in Computational Mathematics, vol. 5, pp. 329-359, (1996) and in E. W. Weisstein, "From MathWorld—A Wolfram Web Resource accessed at http://mathworld.wolfram.com/LambertW-Function.html on Sep. 27, 2006. The total output energy is:

$$E_{out}(T) = \frac{Vh\nu}{\gamma} \cdot \frac{-\ln[R(T)]}{L - \ln[R(T)]} \cdot [n_i - n_f(T)] \qquad (8)$$

where $\gamma$ is the inversion reduction factor which is 1 for a four-level system. Combining equations (5), (7) and (8) and applying the temperature independence condition results in $$\frac{dR(T)}{dT} = \frac{\xi(T)}{1 - \xi(T)} \cdot R(T) \cdot \frac{L - \ln[R(T)]}{\sigma(T)} \frac{d\sigma(T)}{dT} \qquad (9)$$

where $$\xi(T) = \frac{W\left[\frac{-n_i}{n_t(T)} \cdot e^{\frac{-n_i}{n_t(T)}}\right]}{L \cdot \left\{1 + W\left[\frac{-n_i}{n_t(T)} \cdot e^{\frac{-n_i}{n_t(T)}}\right]\right\}} \qquad [5] \qquad (10)$$

Assuming the pump energy makes the initial population $n_i$ reach $1.5 \times 10^{24}$ (m$^{-3}$), the reflectivity versus temperature from equation (9) resulting in a temperature independent actively Q-switched Nd:YAG laser pumped to the same inversion at each temperature is the dotted line in FIG. 3. dR/dT at 293.16K is $-2.17 \times 10^{-4}$.

If the pump power is high enough, the gain will be high enough to support amplified spontaneous emission (ASE) which will deplete the inversion. ASE limits the initial population density to $$n_i(T) = \frac{-\ln[R_{AR} \cdot R(T)]}{2l\sigma(T)} \qquad (11)$$

which is the same form as equation (5). The quantity $R_{AR}$ is the reflectivity of the anti-reflection coating in the laser cavity that can form a resonator that contains the gain medium with one of the cavity mirrors, usually the maximum reflector. The relation between populations, the final population relation and the output energy are almost identical to equations (6), (7) and (8) except that the initial population is temperature dependent. Applying the temperature independence condition, $$\frac{dR(T)}{dT} = \tag{12}$$

$$\frac{R(T) \cdot \ln[R(T)]}{\sigma(T)} \cdot \frac{\{L - \ln[R(T)]\} \cdot W[n_{it}(T) \cdot e^{-n_{it}(T)}] \cdot}{\{W[-n_{it}(T) \cdot e^{-n_{it}(T)}] + 1\} \cdot \{L - \ln[R(T)]\}} \cdot \frac{d\sigma(T)}{dT}$$
$$n_{it}(T) - [n_{it}(T) - 1]\ln[R(T)]$$

Is obtained where $n_{it}(T)$ is the ratio of initial population and threshold population $$n_{it}(T) = \frac{n_i(T)}{n_t(T)} = \frac{-\ln[R_{AR} \cdot R(T)]}{L - \ln[R(T)]} \tag{13}$$

Assuming that $R_{AR}$ is 0.001, the reflectivity versus temperature giving temperature independence for the actively Q-switched Nd:YAG laser pumped to the ASE limit is shown as the dashed line in FIG. 3. dR/dT at 293.16K is $6.09 \times 10^{-3}$.

Next a Nd:YAG laser passively Q-switched by a Cr:YAG saturable absorber having the properties listed in Tables 1 and 2, respectively, is considered. The case of a passively Q-switched laser is much more complicated than either of the preceding cases because the initial population inversion density $n_i$ is also temperature dependent. Following the procedure and notation in Bass et al, "The temperature dependence of $Nd^{3+}$ doped solid-state lasers," IEEE Journal of Quantum Electronics, vol. 39, pp. 741-748, (2003)

$$n_i(T) = \frac{2\sigma_{gs}l_s n_0 - \ln[R(T)] + L}{2l\sigma(T)} \tag{14}$$

The output energy is then $$E_{out}(T) = \frac{Vh\nu}{\gamma}\left(\frac{-\ln[R(T)]}{L - \ln[R(T)]}\right)[n_i(T) - n_f(T)] \tag{15}$$

and the population relation is $$n_f(T) - n_i(T) - n_t(T) \cdot \ln\left[\frac{n_f(T)}{n_i(T)}\right] + \frac{l_s\gamma}{l\gamma_s}n_0 \cdot \left[1 - \left(\frac{n_f(T)}{n_i(T)}\right)^{\alpha'}\right] = 0 \tag{16}$$

Where $\alpha' = \sigma_{gs}/\sigma\gamma$ which follows the notation in Bass et al., "The temperature dependence of $Nd^{3+}$ doped solid-state lasers," IEEE Journal of Quantum Electronics, vol. 39, pp. 741-748, (2003) and G. Xiao and M. Bass, "A generalized model for passively Q-switched lasers including excited state absorption in the saturable absorber," IEEE Journal of Quantum Electronics, vol. 33, pp. 41-44, (1997). $\gamma_s$ is defined as:

$$\gamma_s = \left(1 - \frac{\sigma_{es}}{\sigma_{gs}}\right)^{-1} \tag{17}$$

Here $\sigma_{es}$ and $\sigma_{gs}$ are the excited and ground state absorption cross sections in the saturable absorber. $\gamma_s$ gives the effect of the absorption of a single photon on the population of the ions in the absorber capable of absorbing the laser light. Assuming the saturable absorber (SA) is completely bleached the threshold population density in the Q-switched laser is given as $$n_t(T) = \frac{2\sigma_{es}l_s n_0 - \ln[R(T)] + L}{2l\sigma(T)} \tag{18}$$

In a good passively Q-switched laser $\alpha > 10$ and $n_t > n_f$. Therefore, the last term in equation (16) can be considered =1 so that $$n_f(T) - n_i(T) - n_t(T) \cdot \ln\left[\frac{n_f(T)}{n_i(T)}\right] + \frac{l_s\gamma}{l\gamma_s}n_0 = 0 \tag{19}$$

Combining equations (14), (18) and (19) and solving results in $$n_f(T) = -\frac{2\sigma_{es}l_s n_0 - \ln[R(T)] + L}{2l\sigma(T)} \cdot W(X(T)) \tag{20}$$

Where $X(T)$ is $$X(T) = \tag{21}$$

$$-\frac{2\sigma_{gs}l_s n_0 - \ln[R(T)] + L}{2\sigma_{es}l_s n_0 - \ln[R(T)] + L} \cdot \exp\left[-\frac{\frac{2\sigma_{gs}l_s n_0 - \ln[R(T)] + L}{2l\sigma(T)} - \frac{l_s\gamma}{l\gamma_s}n_0}{\frac{2\sigma_{es}l_s n_0 - \ln[R(T)] + L}{2l\sigma(T)}}\right]$$

Combining equations (14), (15), (20) and (21) gives the output energy as a function of R and σ which are both functions of T. Then differentiation of the output energy with respect to temperature and application of the temperature independence condition results in $$\frac{dR(T)}{dT} = -\frac{2l\sigma(T)R(T)\{L - \ln[R(T)]\}\ln[R(T)] \cdot}{D(T)} \frac{\left\{\frac{2\sigma_{gs}l_s n_0 - \ln[R(T)] + L}{2l\sigma(T)^2} + P(T) \cdot W[X(T)]\right\}}{D(T)} \frac{d\sigma(T)}{dT} \tag{22}$$

where the denominator is $$D(T) = \tag{23}$$

$$\{-L^2 + \{-2\sigma_{es}l_s n_0 + \ln[R(T)]\}L + 2\{L - \ln[R(T)]\} \cdot l \cdot O(T)\sigma(T)R(T)\ln[R(T)]\} \cdot$$
$$W[X(T)] - L^2 + \{-2\sigma_{gs}l_s n_0 + \ln[R(T)]\}L - \ln[R(T)]\}^2$$

and

-continued $$O(T) = \frac{1}{2l\sigma(T)R(T)} + \frac{2\gamma_s(\sigma_{gs}l_sn_0 - \sigma_{es}l_sn_0)^2 - \{2\sigma_{gs}l_sn_0 - \ln[R(T)] + L\} \cdot l_s\gamma n_0\sigma(T)}{\{1 + W[X(T)]\} \cdot \{2\sigma_{es}l_sn_0 - \ln[R(T)] + L\} \cdot \{2\sigma_{gs}l_sn_0 - \ln[R(T)] + L\}} \text{ and} \quad (24)$$

$$l\gamma_sn_0R(T)\sigma(T)$$

$$P(T) = \left(\frac{2\sigma_{gs}l_sn_0 - \ln[R(T)] + L}{2l\sigma(T)} - \frac{1}{1 + W[X(T)]l\gamma_s}n_0\right)\frac{1}{\sigma(T)} \quad (25)$$

The properties of the saturable absorber used in this example are listed in Table 2.

TABLE 2

| Saturable absorber material | $Cr^{4+}$:YAG |
|---|---|
| $\sigma_{gs}$ (1/m$^2$) | $8.7 \times 10^{-23}$ |
| $\sigma_{es}$ (1/m$^2$) | $2.2 \times 10^{-23}$ |
| $n_o$ (1/m$^3$) | $2.7 \times 10^{-24}$ |
| $l_s$ (m) | 0.008 |

The reflectivity versus temperature for a temperature independent passively Q-switched Nd:YAG laser is shown as the solid line in FIG. 3. dR/dT at 293.16K is $-2.09 \times 10^{-3}$.

FIG. 3 presents plots giving the reflectivity verses temperature that would result in a temperature independent Nd:YAG laser of the 4 types considered. The required variation of reflectivity over the temperature range appropriate to such lasers is relatively small and largely linear in each case. This variation of reflectivity with temperature can be achieved in a VBG mirror that is thin but that has higher index of refraction change. This VBG design leads to a reflectivity that varies as required over a wide temperature range as described in U.S. Pat. No. 6,586,141 issued Jul. 1, 2003 to O. M. Efimov, L. B. Glebov, L. N. Glebova, V. I. Smirnov, titled "Process for production of high efficiency volume diffractive elements in photo-thermo-refractive glass" and in U.S. Pat. No. 6,673, 497 B2, issued Jan. 6, 2004 to O. M. Efimov, L. B. Glebov, V. I. Smirnov and titled "High efficiency volume diffractive elements in photo-thermo-refractive glass".

Figure 4:
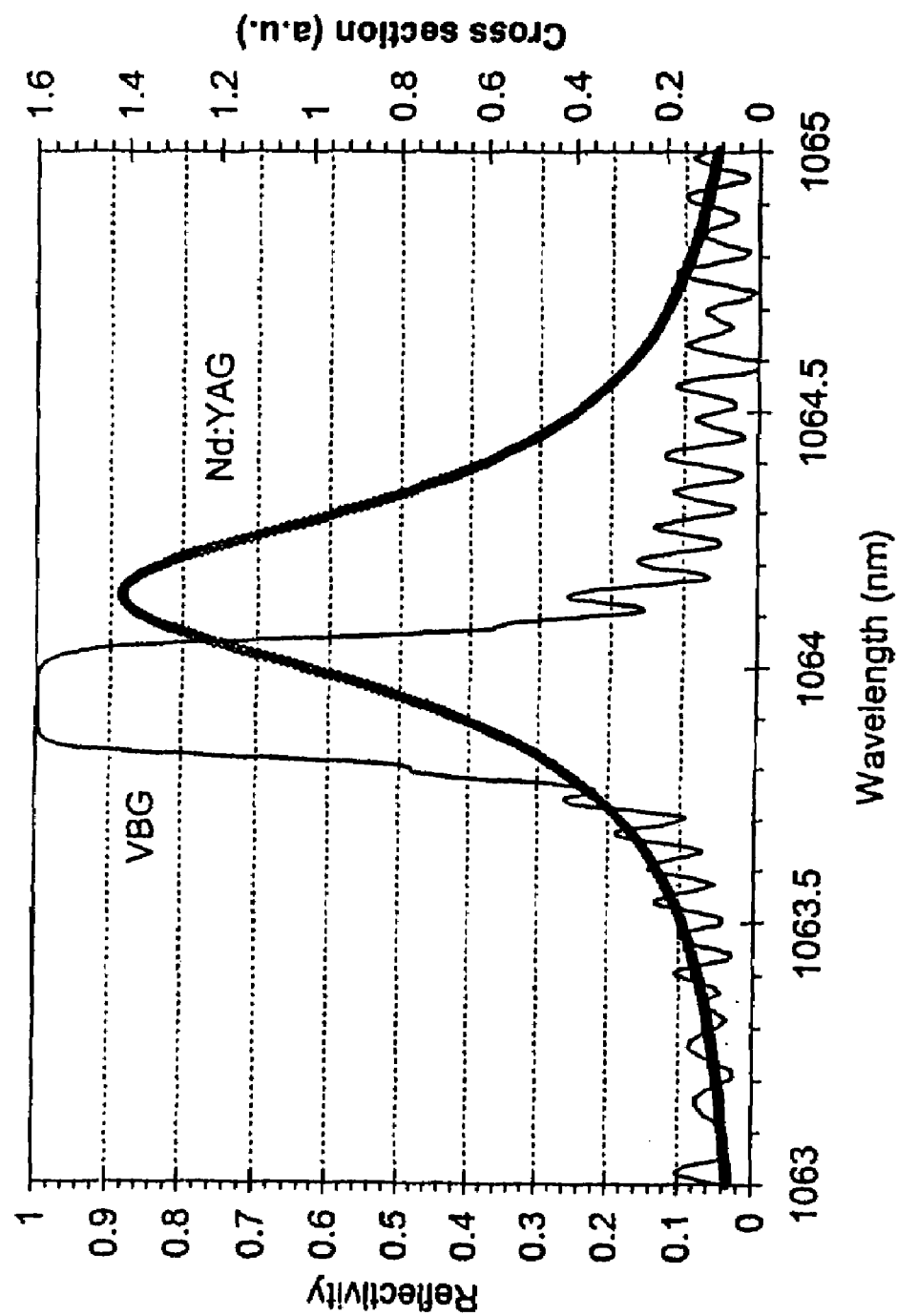
FIG. 4 is a graph showing the reflectivity spectrum of a VBG and the emission spectrum of the Nd:YAG laser.

FIG. 4 shows the reflectively of a volume Bragg grating (labeled as VBG) and the emission spectrum of the Nd:YAG laser. While the reflectively of the volume Bragg grating in the central region is very high and is independent of wavelength, it has a very sharp drop off on either side of the central region. A well known feature of the volume Bragg grating reflectively is that the wavelength at which the reflectively occurs depends on the temperature of the grating due to the thermal expansion in the material changing the spacing of the Bragg grating planes. The wavelength of maximum reflectivity increases with increasing temperature.

The temperature shift of the volume Bragg grating reflectively wavelength means that the reflectively of the volume Bragg grating mirror in the region of the narrow spectrum laser changes with temperature if the drop off region is selected to be at the wavelength at which lasing occurs.

As shown in FIG. 4, the Nd:YAG emission spectrum is fixed. The volume Bragg grating reflectively curve shows that at the temperature at which this reflectively was measured, lasing occurs at approximately 1064 nm wavelength where the reflectively of the volume Bragg grating is approximately 75%. If the volume Bragg grating temperature is changed, the volume Bragg grating curve shifts in wavelength. For example, if the curve shifts to a longer wavelength, the reflectively of the volume Bragg grating at 1064 nm wavelength increases. Similarly, if the curve shifts to a shorter wavelength, then the reflectively of the volume Bragg grating at a 1064 nm wavelength decreases. Similar results apply when the volume Bragg grating drop off provides feedback at the peak of the Nd:YAG emission spectrum and the results apply when the wavelength drop off occurs on the short wavelength side of the volume Bragg grating spectrum.

When the curve drop off is on the long wavelength side of the volume Bragg grating spectrum, the reflectively increases with temperature as would be required for a temperature independent long pulse Nd:YAG laser. When the drop off is on the short wavelength side of the volume Bragg grating spectrum, the reflectively decreases with temperature as is required for use with a temperature independent actively Q-switched laser pumped to approximately the same level of inversion at each selected temperature.

The lasers of the present invention are temperature independent or nearly independent lasers using narrow spectrum gain media such as Nd:YAG or Nd:GSGG or other materials in conjunction with at least one volume Bragg grating mirror with temperature dependent reflectance in the region where stimulated emission occurs. The temperature of the volume Bragg grating mirror can be approximately the ambient temperature of the laser's environment if dR/dT, the change of reflectively with temperature, compensates for $d\sigma_{stim\ em}/dT$, the change in the stimulated emission cross section with temperature. This type of compensation may be sufficient to greatly reduce the dependence of the output on temperature.

However, it may not always provide operation at the optimal reflectively that would result in an optimal output. Optionally, such optimal operation may be achieved by controlling the temperature of the volume Bragg grating mirror by placing the volume Bragg grating mirror in an appropriately temperature controlled chamber that is capable of both heating and cooling and then adjusting the temperature in the chamber to maintain an optimum output coupling at approximately all temperatures at which the laser is expected to be operated.

In an embodiment, the present invention uses volume Bragg mirrors that are temperature controlled to operate with a reflectively that optimizes the output of the laser. The optimal reflectively can be calculated by differentiating the expression for the output energy with respect to the output coupler reflectively and setting the derivative equal to zero. The reflectively that satisfies the equation is the reflectively that optimizes the laser's output. Using a volume Bragg grating mirror in one or the other of the drop off regions allows one to temperature tune the reflectivity at the lasing wavelength to be the desired optimal value. Therefore, the present invention uses a volume Bragg grating mirror to optimize the laser's output without testing the use of several different reflectively mirrors to achieve the optimal laser output.

We claim:

1. A solid state laser having temperature independent performance for a stabilized laser output comprising:
a solid state laser using a narrow gain spectrum media, the laser including:
a laser resonator having at least one volume Bragg grating mirror with a temperature dependent reflectance in a region where stimulated emission of the solid state laser occurs, wherein a change in reflectivity of the volume Bragg grating mirror with operational temperature changes of the gain medium of the solid sate laser stabilizes the output of the solid state laser by compensating for a change in stimulated emission cross section with a temperature change of the gain media of the solid state laser to control a performance of the solid state laser by stabilizing the output.

2. The laser of claim 1, wherein the at least one volume Bragg grating mirror comprises:
a first volume Bragg grating mirror having a first reflectance; and
a second volume Bragg grating mirror having a second reflectance, wherein the temperature difference between the first and second volume Bragg grating mirrors is selected so that the reflectance spectrum of one volume Bragg grating mirror is shifted with respect to the other to alter the effective reflectance in the resonator for stabilizing the output of the solid state laser.

3. The laser of claim 1, further comprising:
a temperature controlled chamber for housing the at least one volume Bragg grating mirror to maintain optimum output coupling with a change in environmental temperatures.

4. The laser of claim 1, wherein the laser comprises:
a long pulse solid state laser, wherein the reflectively of the at least one volume Bragg grating mirror increases with temperature to maintain constant output energy.

5. The laser of claim 1, wherein the laser comprises:
a short pulse solid state laser, wherein the reflectively of the at least one volume Bragg grating mirror decreases with temperature to maintain constant output energy.

6. The laser of claim 1, wherein the laser comprises:
a Q-switched solid state laser, wherein the reflectively of the at least one volume Bragg grating mirror increases with temperature to maintain constant output energy when the laser input energy is kept constant at all temperatures.

7. The laser of claim 1, wherein the laser comprises:
a Q-switched solid state laser, wherein the reflectively of the at least one volume Bragg grating mirror decreases with temperature to maintain constant output energy.

8. A method for optimizing a laser output energy comprising the steps of:
providing a solid state laser;
selecting at least one volume Bragg grating mirror prepared in photo-thermal refractive glass that is temperature dependent, a reflectivity of the at least one volume Bragg grating changing with operational temperature changes of a gain medium of the solid state laser to stabilize the solid state laser output by compensating for a change in the stimulated emission cross section of a gain medium to control a performance of the solid state laser by stabilizing the output energy of the solid state laser; and
coupling a resonator incorporating the least one volume Bragg grating mirror with the solid state laser to optimize the output energy of the solid state laser, wherein the solid state laser operates over a wide range of temperatures with minimal variation in output performance.

9. The method of claim 8, wherein the selecting step comprises the step of:
determining a temperature independent performance of the solid state laser, wherein the temperature independent performance is one for which the derivative of the output energy with respect to temperature, $dE_{out}(T)/dT$, is approximately equal to zero.

10. The method of claim 9, wherein the temperature independent operation determination step comprises the step of:
finding an output energy equation; and
differentiating the output energy equation with respect to temperature to find the temperature independence condition $dE_{out}(T)/dT=0$.

11. The method of claim 8, wherein the selecting step comprises the step of:
calculating an optimal reflectivity of the volume Bragg grating mirror by differentiating the expression for the output energy with respect to the output coupler reflectively and setting the derivative equal to zero, wherein the reflectively that satisfies the equation is the reflectively that which optimizes the output of the solid state laser.

12. The method of claim 8, further comprising the step of:
temperature tuning the reflectivity of the volume Bragg grating mirror at a lasing wavelength to optimize the output of the solid state laser, wherein when optimally tuned, the volume Bragg grating mirror is in a drop off region of the volume Bragg grating mirror reflectively wavelength.

13. The method of claim 8, wherein selecting at least one volume Bragg grating mirror comprises the step of:
selecting a first and a second volume Bragg grating mirror so that a temperature difference $\Delta T$ between the first and the second volume Bragg grating mirror shifts the reflectance spectrum of one of the first and second volume Bragg grating mirrors with respect to the other to alter the effective reflectance in the resonator.

14. The method of claim 13, further comprising the step of:
selecting the temperature difference $\Delta T$ to optimize the output of the solid state laser; and
selecting a change in reflectivity with temperature to maintain the optimized output over a wide range of operational temperatures.

15. The method of claim 14, wherein the temperature difference selection step comprises the step of:
selecting $\Delta T$ to exceed 21° C. to increase the resonator output coupling.

* * * * *